(12) United States Patent
Song (10) Patent No.: US 11,440,124 B2
(45) Date of Patent: Sep. 13, 2022

(54) JOINING APPARATUS FOR PANEL SHEETS AND JOINING METHOD FOR PANEL SHEETS USING THE SAME

(71) Applicants: Hyundai Motor Company, Seoul (KR); Kia Motors Corporation, Seoul (KR)

(72) Inventor: Jae Hun Song, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 412 days.

(21) Appl. No.: 16/549,642

(22) Filed: Aug. 23, 2019

(65) Prior Publication Data

US 2019/0375039 A1 Dec. 12, 2019

Related U.S. Application Data

(62) Division of application No. 15/373,612, filed on Dec. 9, 2016, now Pat. No. 10,391,581.

(30) Foreign Application Priority Data

Sep. 1, 2016 (KR) ......................... 10-2016-0112723

(51) Int. Cl.
| | |
|---|---|
| *B23K 11/31* | (2006.01) |
| *B23K 11/34* | (2006.01) |
| *B23K 11/36* | (2006.01) |
| *B23K 11/087* | (2006.01) |
| *B23K 11/20* | (2006.01) |
| *B23K 103/04* | (2006.01) |

(Continued)

(52) U.S. Cl.
CPC ............ *B23K 11/087* (2013.01); *B23K 11/20* (2013.01); *B23K 11/314* (2013.01); *B23K 11/318* (2013.01); *B23K 2103/04* (2018.08); *B23K 2103/10* (2018.08); *B23K 2103/20* (2018.08)

(58) Field of Classification Search
CPC .............. B23K 11/24; B23K 11/31–34; B23K 11/36–368; B23K 11/11–115
See application file for complete search history.

(56) References Cited

U.S. PATENT DOCUMENTS

| | | |
|---|---|---|
| 3,604,612 A | 9/1971 | Miller et al. |
| 4,951,375 A | 8/1990 | Erlenmaier |

(Continued)

FOREIGN PATENT DOCUMENTS

| | | |
|---|---|---|
| KR | 10-2014-0025770 A | 3/2014 |
| KR | 10-1448762 B1 | 10/2014 |
| KR | 10-2016-0117556 A | 10/2016 |

OTHER PUBLICATIONS

Meschut, G. et al., "Innovative and Highly Productive Joining Technologies for Multi-Material Lightweight Car Body Structures", Journal of Materials Engineering and Performance, vol. 23(5), May 2014, pp. 1515-1523.

*Primary Examiner* — Michael A Laflame, Jr.
(74) *Attorney, Agent, or Firm* — Fox Rothschild LLP (57) ABSTRACT

A joining apparatus for panel sheets and a joining method for panel sheets using the same are provided. The joining apparatus includes an element punching device which stores and supplies elements according to a specification of a panel sheet and inserts the element into a first panel sheet among different types of panel sheets. Additionally, a welding device resistively welds a part of the first panel sheet into which the element is inserted by the element punching device.

3 Claims, 6 Drawing Sheets (51) Int. Cl.
 *B23K 103/10* (2006.01)
 *B23K 103/20* (2006.01)

(56) References Cited

U.S. PATENT DOCUMENTS

| | | |
|---|---|---|
| 7,429,713 B2 | 9/2008 | Wang et al. |
| 7,877,850 B2 | 2/2011 | Wang et al. |
| 2010/0083481 A1 | 4/2010 | Luo et al. |
| 2015/0217395 A1 | 8/2015 | Spinella et al. |
| 2016/0221109 A1 | 8/2016 | Pieterman |

JOINING APPARATUS FOR PANEL SHEETS AND JOINING METHOD FOR PANEL SHEETS USING THE SAME

CROSS-REFERENCE TO RELATED APPLICATION

This application is a Divisional Application of U.S. patent application Ser. No. 15/373,612 filed on Dec. 9, 2016, which claims priority to and the benefit of Korean Patent Application No. 10-2016-0112723 filed in the Korean Intellectual Property Office on Sep. 1, 2016, the entire contents of which are incorporated herein by reference.

BACKGROUND

(a) Field of the Invention

The present invention relates to a joining apparatus for panel sheets and a joining method for panel sheets using the same, and more particularly, to a joining apparatus for panel sheets which simultaneously includes an element punching function and a panel sheet welding function and a joining method for panel sheets using the same.

(b) Description of the Related Art

Recently, in a configuration of a vehicle body, usage of a light weight material is being increased for the purpose improving fuel efficiency. In accordance with the increase of light weight material, a combination of different types of steels, for example, aluminum and steel has increased. However, when the welding is applied to the combination of the different types of steels, a quality problem may be caused due to galvanic corrosion.

To reduce the problem of galvanic corrosion, a non-welding type joining technique is required. However, to utilize the non-welding type joining technique, all welding apparatuses of a joining process in the related art need to be replaced and initial investment costs are increased substantially. Recently, to solve the above-mentioned problem, a welding method using a resistance spot welding (RSW) device has applied to the vehicle body.

However, the RSW device requires an additional device which supplies a separate element to be inserted to prevent the galvanic corrosion. Further, to supply elements according to individual sizes, equipment is required for each different size, which may increase the investment costs and a size of a process facilities. Further, the RSW device of the related art includes a moving device and a control device, thus causing the process to be complex. Therefore, maintenance of the system may be more difficult.

The above information disclosed in this section is merely for enhancement of understanding of the background of the invention and therefore it may contain information that does not form the prior art that is already known in this country to a person of ordinary skill in the art.

SUMMARY

The present invention provides a joining apparatus for panel sheets and a joining method for panel sheets using the same which may simultaneously accommodate a plurality of elements according to individual specifications to be commonly used regardless of the type of panel sheets to be joined, thereby decreasing plant and equipment investment costs.

An exemplary embodiment of the present invention provides a joining apparatus for panel sheets which joins different types of panel sheets including an element punching device configured to store and supply elements according to a specification of a panel sheet and insert the element into a first panel sheet among different types of panel sheets; and a welding device configured to resistively weld a part of the first panel sheet into which the element is inserted by the element punching device.

The element punching device may include an element supply unit configured to store and supply the element; and a punching unit configured to insert the element supplied from the element supply unit toward a second panel sheet. The punching unit may include a punch cylinder disposed at an outer side of the element supply unit and a punch configured to insert the element into the panel sheet based on an operation of the punch cylinder. The welding device may include a C type resistance welding gun.

Another exemplary embodiment of the present invention provides a joining apparatus of panel sheets which joins different types of panel sheets that may include: a distance adjusting device having a frame and first and second driving sliders movably disposed on a lower surface of the frame to adjust a distance therebetween; an element punching device disposed on the first driving slider of the distance adjusting device and having an element supply unit configured to store and supply an element and a punching unit configured to insert the element supplied from the element supply unit into a first panel sheet among different types of panel sheets; and a welding device disposed on the second driving slider of the distance adjusting device and configured to resistively weld a part of the element which is inserted by the element punching device.

The distance adjusting device may include partially circular first and second guide rails disposed at both sides along a circumference on a lower surface of the frame formed to have a disc block shape and first and second driving sliders slidably disposed on the first and second guide rails. The first and second driving sliders may be movably disposed by a linear motor. The element supply unit may include an accommodating box for individual specification which is provided to an upper part of a fixed housing between a pair of fixing brackets disposed in the first driving slider to distinguish and store the elements for individual specifications and a supply block in which a supply aperture which arranges elements supplied from the accommodating box for individual specifications in the panel sheet may be formed below the housing.

The punching unit may include a punch disposed in a position that corresponds to the supply aperture of the supply block to insert the element into the panel sheet and a punch cylinder disposed above the punch to supply a pressurizing force to the punch. The punch cylinder may be mounted in a connecting bracket connected to a lower part of the fixing bracket and may be disposed extraneous to the element supply unit from a center of the frame.

The welding device may include a C type frame disposed on a second driving slider of the distance adjusting device through a mounting bracket; a pressurizing cylinder disposed above the C type frame; an upper electrode disposed at a front edge of a load of the pressurizing cylinder; and a lower electrode disposed at a lower end of the C type frame. The upper electrode and the lower electrode may configure a C type resistance welding gun and the panel sheet into which the element is inserted may be resistively welded by the C type resistance welding gun.

Yet another exemplary embodiment of the present invention provides a joining method of panel sheets that may include: locating a supply block configured to supply an element in a position that corresponds to a joining portion of different types of panel sheets loaded on a die; inserting the element into a first panel sheet among the different types of panel sheets through a punch operating by a punch cylinder to a supply aperture formed in the supply block; pressurizing upper and lower electrodes while locating upper and lower electrodes of a welding device corresponding to upper and lower sides of the joining portion of different types of panel sheets; and resistively welding a part of the first panel sheet into which the element is inserted through the upper and lower electrodes by supplying power to the welding device. In the different types of panel sheets loaded on the die, a sealer may be applied between a first panel sheet and a second panel sheet to form a sealer layer. The first panel sheet may be formed of an aluminum material and the second panel sheet may be formed of a steel material.

According to an exemplary embodiment of the present invention, a plurality of elements according to individual specifications may be accommodated to be commonly used regardless of the type of panel sheets to be joined, thereby reducing plant and equipment investment costs. Further, according to an exemplary embodiment of the present invention, a punching unit and a welding device may be simultaneously provided and a pitch of the element punching device and the welding device may be adjusted according to a plurality of panel sheets to be jointed, thereby reducing a process time.

In addition, effects which may be achieved or expected by the exemplary embodiment of the present invention may be directly or implicitly disclosed in detailed description of the exemplary embodiment of the present invention. Various effects expected according to an exemplary embodiment of the present invention will be disclosed in the following detailed description.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention will be described with reference to the accompanying drawings. However, the following drawings and detailed description relate to one exemplary embodiment among various exemplary embodiments for effectively describing characteristics of the present invention. Therefore, the present invention is not limited to the following drawings and description.

Figure 1:
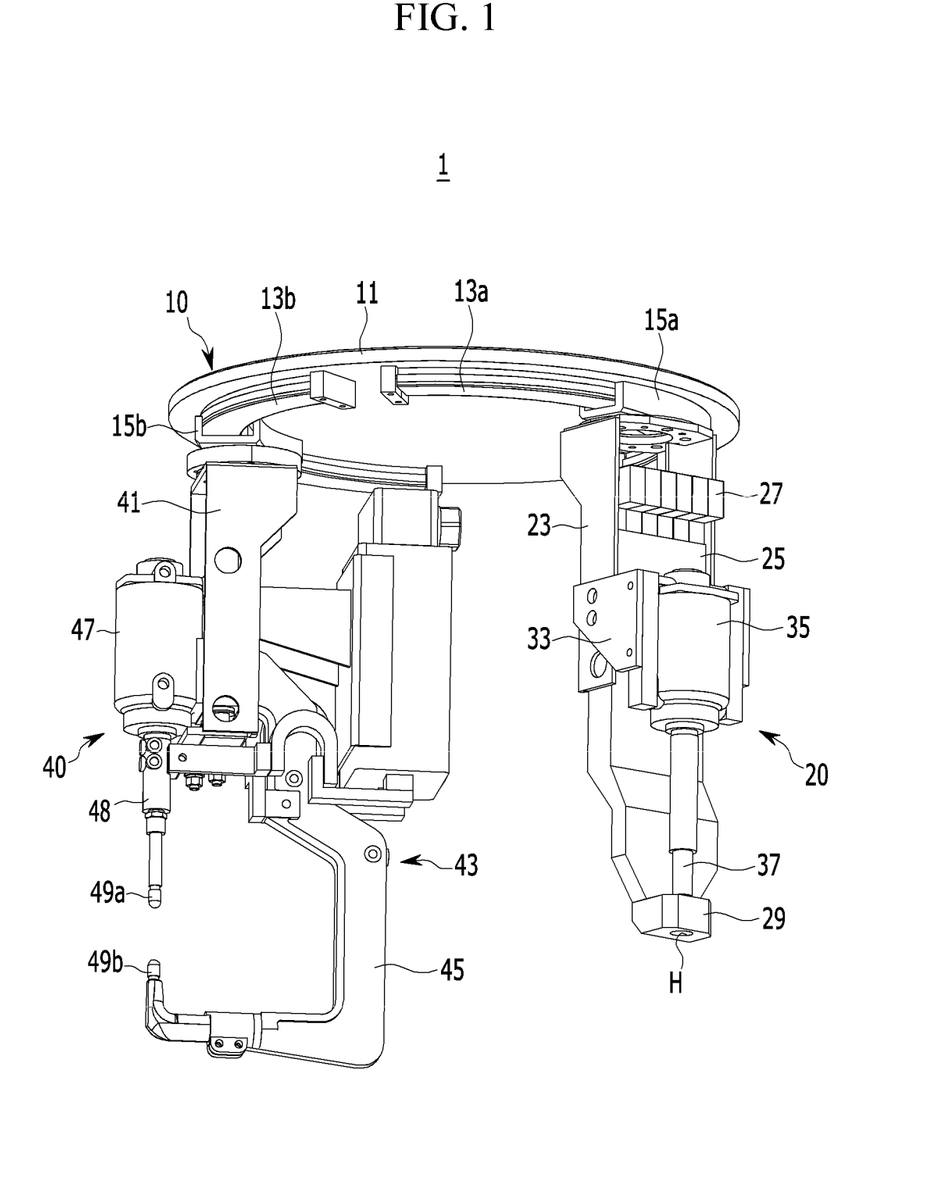
FIG. 1 is a perspective view of a joining apparatus for panel sheets according to an exemplary embodiment of the present invention.
Figure 2:
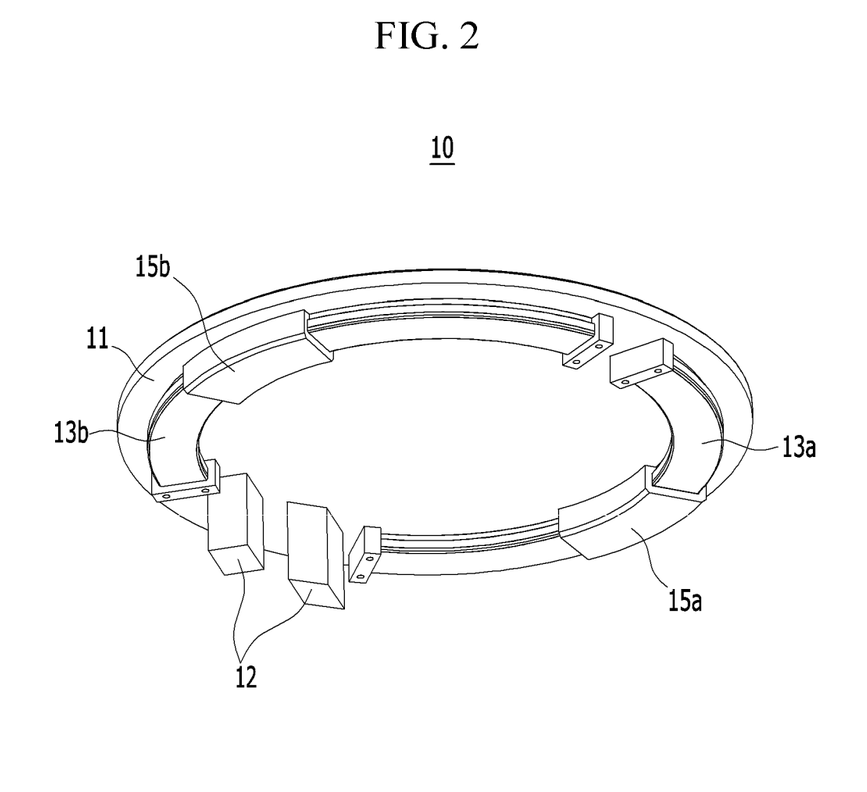
FIG. 2 is a perspective view of a distance adjusting device of a joining apparatus for panel sheets according to an exemplary embodiment of the present invention.
Figure 3:
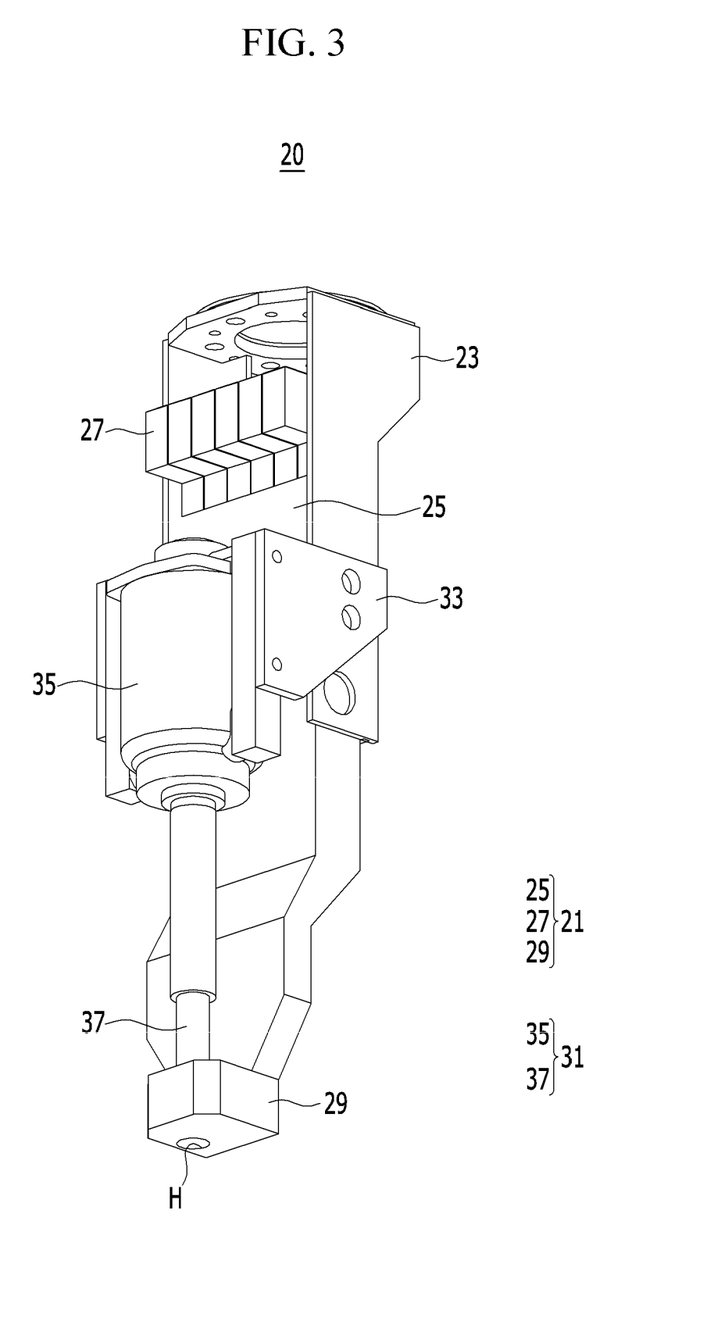
FIG. 3 is a perspective view of an element punching device of a joining apparatus for panel sheets according to an exemplary embodiment of the present invention.
Figure 4:
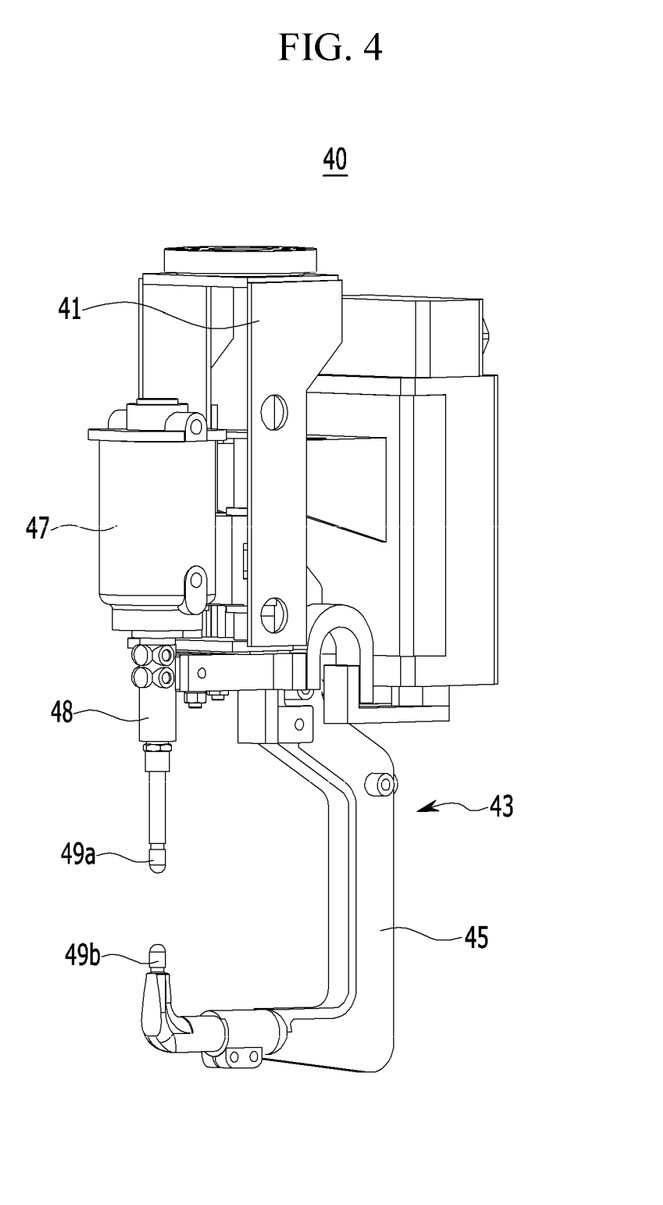
FIG. 4 is a perspective view of a welding device of a joining apparatus for panel sheets according to an exemplary embodiment of the present invention.

FIG. 1 is a perspective view of a joining apparatus for panel sheets according to an exemplary embodiment of the present invention, FIG. 2 is a perspective view of a distance adjusting device of a joining apparatus for panel sheets according to an exemplary embodiment of the present invention, FIG. 3 is a perspective view of an element punching device of a joining apparatus for panel sheets according to an exemplary embodiment of the present invention, and FIG. 4 is a perspective view of a welding device of a joining apparatus for panel sheets according to an exemplary embodiment of the present invention.

Referring to FIG. 1, a joining apparatus 1 for panel sheets according to an exemplary embodiment of the present invention may be applied to join different types of panel sheets (e.g., a first panel sheet and a second panel sheet). Further, in the joining apparatus 1 for panel sheets, among different types of panel sheets to be joined, as a lower panel sheet (e.g., second panel sheet), the same material as an element (e.g., a working piece or working element) may be applied to be resistively welded with the element. The joining apparatus 1 of panel sheets may include a distance adjusting device 10, an element punching device 20, and a welding device 40. The various devices of the apparatus may be operated by a controller having a memory and a processor.

Referring to FIG. 2, the distance adjusting device 10 may include a frame 11 mounted on an arm front edge of a robot (not illustrated). The frame 11 may be formed to have a shape of a disc block. Further, the frame 11 may include a first guide rail 13a and a second guide rail 13b disposed at both sides of the frame along a lower circumference. The first guide rail 13a and the second guide rail 13b may be formed to be partially circular. In particular, in the first guide rail 13a and the second guide rail 13b, a first driving slider 15a and a second driving slider 15b may be disposed, respectively. A linear motor 12 is provided to allow the first driving slider 15a and the second driving slider 15b to slidably move along the first guide rail 13a and second guide rail 13b to adjust a distance therebetween.

Referring to FIG. 3, the element punching device 20 may include an element supply unit 21 and a punching unit 31. The element supply unit 21 may be disposed on the first driving slider 15a of the distance adjusting device 10 via a fixing bracket 23. Further, the element supply unit 21 may include an accommodating box 27 for every specification which distinguishes and stores an element 5 for every specification above a housing 25 fixed between a pair of fixing brackets 23. The element supply unit 21 may also include a supply block 29 connected to the accommodating box 27 for every specification below the housing 25. In particular, in the supply block 29, a supply aperture H may be formed to pass through the supply block and the elements 5 may be arranged on the panel sheet through the supply aperture H. The elements 5 may be supplied through a supply tube (not illustrated) which connects the accommodating box 27 for every specification and the supply block 29.

In other words, the supply tube may be configured in the housing 25 and may be supplied from the accommodating boxes 27 for individual specifications to be combined at an upper side of the supply block 29 and to be disposed toward the supply aperture H of the supply block 29. The supply tube may be a hose formed of a rubber material or may be a pipe material formed of steel or a plastic material, but is not limited thereto. The punching unit 31 may be disposed below the fixing bracket 23 via a connecting bracket 33. In particular, in the punching unit 31, to locate (e.g., to move) a punch 37 in a position that corresponds to the supply aperture H of the supply block 29, a punch cylinder 35 may be mounted in the connecting bracket 33 connected with a lower side of the fixing bracket 23 and disposed extraneous to the element supply unit 21 from a center of the frame. The punching unit 31 may be configured to insert the element 5 supplied from the element supply unit 21 into a first panel sheet 3a among different types of panel sheets.

Referring to FIG. 4, the welding device 40 may be disposed on the second driving slider 15b of the distance adjusting device 10 via the mounting bracket 41. In particular, the welding device 40 may include a resistance welding gun 43 and the resistance welding gun 43 may be a C type welding gun. The welding apparatus 40 is configured by a C type frame 45 and a pressurizing cylinder 47 may be disposed above the C type frame 45.

In the welding device 40, an upper electrode 49a may be disposed at a front edge of a load 48 of the pressurizing cylinder 47 and a lower electrode 49b may be disposed at a lower end of the C type frame 45. The upper electrode 49a and the lower electrode 49b configure a C type resistance welding gun. The welding device 40 may be configured to apply an electric current to the different types of panel sheets to which the element 5 is inserted through the upper electrode 49a and the lower electrode 49b to resistively weld the edge of the element 5 to the second panel sheet 3b.

Figure 5:
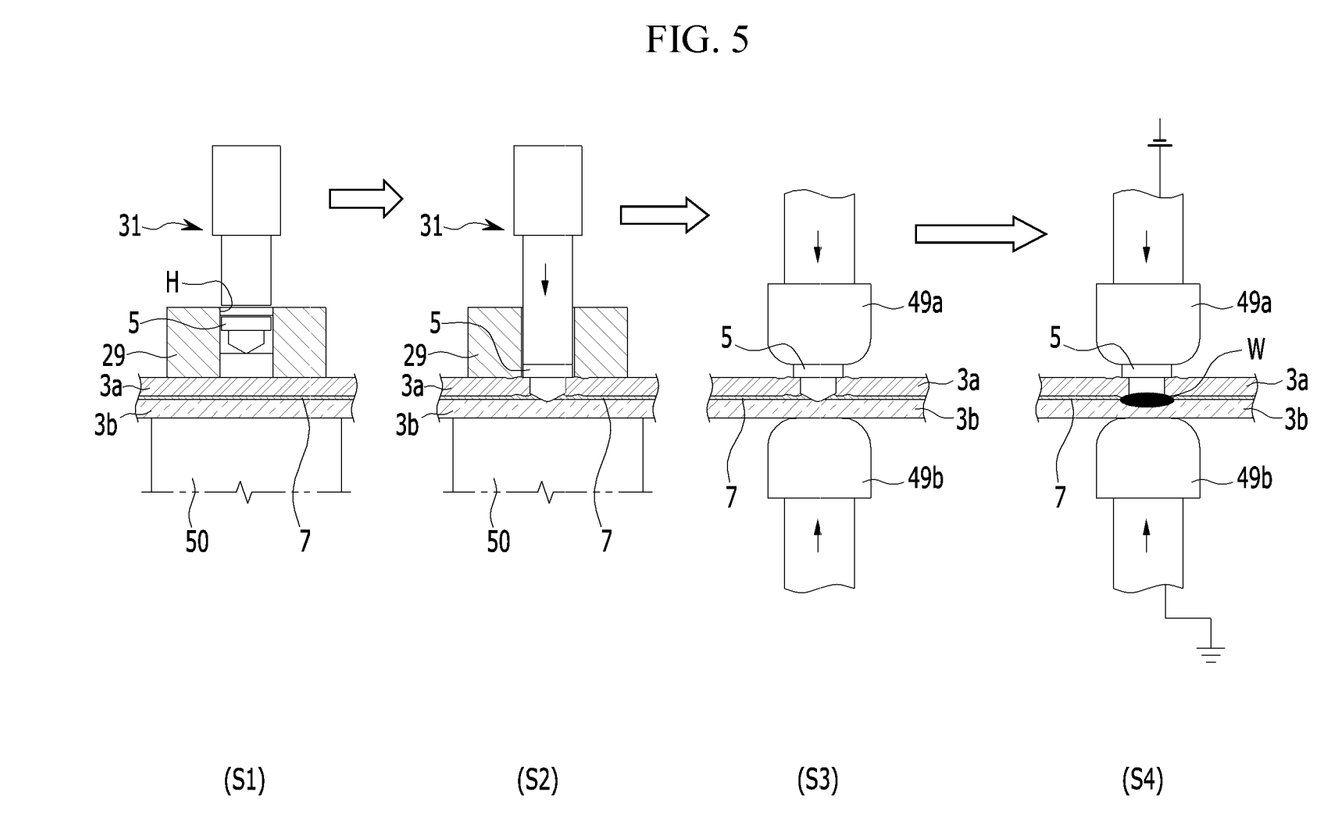
FIG. 5 is a flowchart illustrating processes of a joining method for panel sheets according to an exemplary embodiment of the present invention.

FIG. 5 is a flowchart illustrating processes of a joining method for panel sheets according to an exemplary embodiment of the present invention. A method for joining panel sheets using the joining apparatus for panel sheets configured as described above will be described below. Referring to FIG. 5, an element supply step S1 of locating a supply block 29 configured to supply an element 5 for joining panel sheets in a position that corresponds to a joining portion of different types of panel sheets loaded on a die 50 may be performed.

In particular, the different types of panel sheets loaded on the die 50 may include a first panel sheet 3a and a second panel sheet 3b. A sealer may be applied between the first panel sheet 3a and the second panel sheet 3b to form a sealer layer 7. Further, among the different types of panel sheets, the first panel sheet 3a may be formed of an aluminum material and the second panel sheet 3b and an element 5 (e.g., working part) may be formed of a steel material.

Even though it is described that in the different types of panel sheets according to an exemplary embodiment of the present invention, the first panel sheet 3a is formed of an aluminum material and the second panel sheet 3b and the element 5 are formed of a steel material, as an example. However, the present invention is not necessarily limited thereto. When a panel sheet has enough ductility to insert the element 5 thereto, the panel sheet may be applied as the first panel sheet 3a. Further, when a panel sheet has a rigidity which is greater than that of the first panel sheet 3a and is formed of the same material as the element 5, the panel sheet may be used as the second panel sheet 3b.

An element inserting step S2 may then be performed of forwardly operating a punch operated by a punch cylinder 35 toward the supply aperture H formed on the supply block 29 to insert the element 5 into the first panel sheet 3a among the different types of panel sheets. Subsequently, a pressurizing step S3 may be performed of pressurizing the upper electrode 49a and the lower electrode 49b while locating the upper electrode 49a and the lower electrode 49b of the welding device 40 corresponding to an upper side and a lower side of the joining portion of the different types of panel sheets. Finally, a welding step S4 of supplying power to the welding device 40 to resistively weld the edge of the element 5 to the lower panel sheet 3b among the different types of panel sheets through the upper electrode 49a and the lower electrode 49b may be performed.

Figure 6:
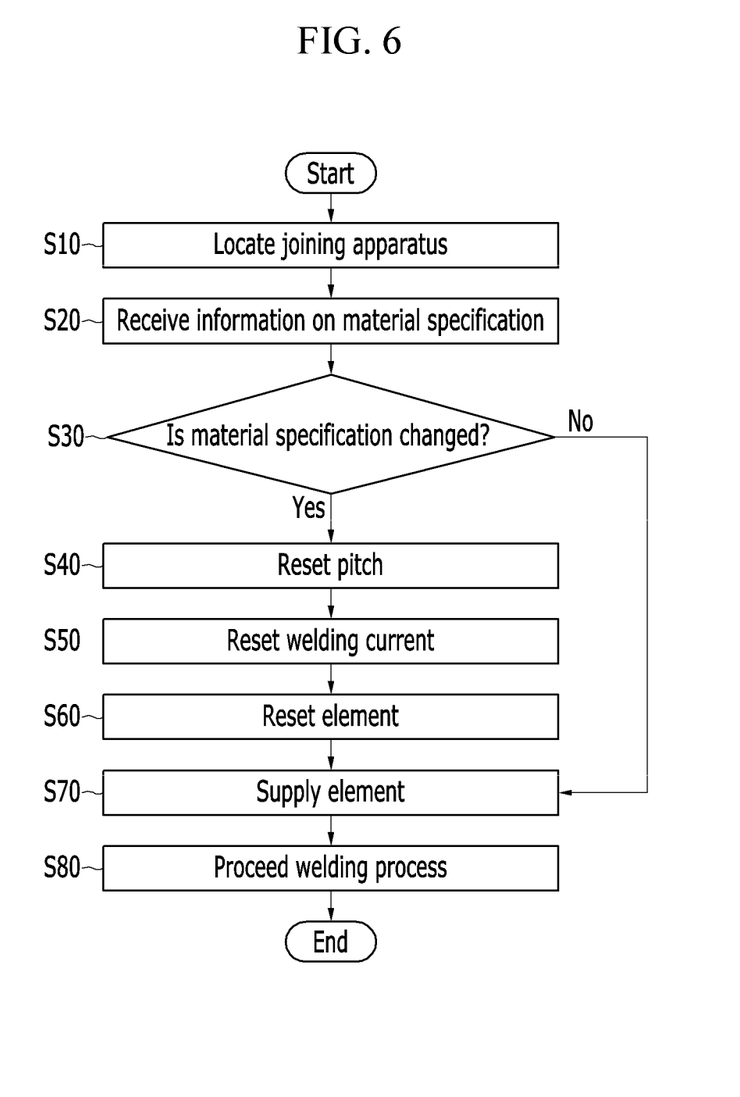
FIG. 6 is a view illustrating a control method of a joining apparatus for panel sheets according to an exemplary embodiment of the present invention.

FIG. 6 is a view illustrating a control method of a joining apparatus for panel sheets according to an exemplary embodiment of the present invention. A control method of the joining apparatus for panel sheets configured as described above will be described below. Referring to FIG. 6, a controller (not illustrated) may be configured to locate a joining apparatus 1 with respect to a joining portion of different types of panel sheets which are seated on a die 50 in step S10.

The controller may then be configured to receive specification information of the different types of panel sheets to be joined in step S20. Additionally, the controller may be configured to determine whether the received specification information of different types of the panel sheets is changed by comparing the received specification information of the different types of panel sheets with predetermined specification information of the different types of panel sheets in step S30.

Further, when the received specification information of the different types of panel sheets does not match the predetermined specification information of the different types of panel sheets, the controller may be configured to reset a distance between an element punching device 20 and a welding device 40 according to the received specification information of the different types of panel sheets in step S40. Particularly, the predetermined specification information of the different types of panel sheets is a value input before operating the joining apparatus 1. Subsequently, the controller may be configured to reset a welding current applied to the welding device 40 according to the received specification information of the different types of panel sheets in step S50.

In addition, the controller may be configured to select the element 5 according to the received specification information of the different types of panel sheets in step S60. The controller may then be configured to supply the selected element 5 to a supply aperture H formed in a supply block 29 of the element punching device 20 in step S70. In particular, the element 5 may be moved to the supply block 29 through a supply tube (not illustrated) connected from an accommodating box 27 for individual specifications of the element punching device 20 to be seated in the supply aperture H. Subsequently, the controller may be configured to perform a welding process which inserts the supplied element 5 into the first panel sheet 3a among the different types of panel sheets through the element punching device 20 and then welds W the first panel sheet to the joining portion in which the element 5 is inserted through the welding device 40 in step S80.

Therefore, according to an exemplary embodiment of the present invention, a joining apparatus for panel sheets and a joining method for panel sheets using the same may accommodate a plurality of elements 5 according to individual specifications to be commonly used regardless of the type of panel sheets, thereby reducing plant and equipment investment costs. According to an exemplary embodiment of the present invention, a joining apparatus for panel sheets and a joining method for panel sheets using the same may simultaneously include a punching function and a welding function, to decrease a process time.

While this invention has been described in connection with what is presently considered to be example embodiments, it is to be understood that the invention is not limited to the disclosed exemplary embodiments, but, on the contrary, is intended to cover various modifications and equivalent arrangements included within the spirit and scope of the appended claims.

What is claimed is:

1. A joining method of panel sheets, comprising:
   locating, by a controller, a supply block configured to supply an element in a position that corresponds to a joining portion of different types of panel sheets loaded on a die;
   inserting, by the controller, the element into a first panel sheet among the different types of panel sheets through a punch operated by a punch cylinder to a supply aperture formed in the supply block;
   pressurizing, by the controller, upper and lower electrodes while locating upper and lower electrodes of a welding device that corresponds to upper and lower sides of the joining portion of different types of panel sheets; and
   resistively welding, by the controller, the edge of the element to a second panel sheet among the different types of panel sheets through the upper and lower electrodes by supplying power to the welding device.

2. The joining method of claim 1, wherein in the different types of panel sheets loaded on the die, a sealer is applied between a first panel sheet and a second panel sheet to form a sealer layer.

3. The joining method of claim 2, wherein the first panel sheet is formed of an aluminum material and the second panel sheet is formed of a steel material.

* * * * *